US011180131B2

(12) United States Patent
Kim

(10) Patent No.: US 11,180,131 B2
(45) Date of Patent: Nov. 23, 2021

(54) CONTROL SYSTEM FOR HYBRID VEHICLE

(71) Applicant: TOYOTA JIDOSHA KABUSHIKI KAISHA, Toyota (JP)

(72) Inventor: Jonggap Kim, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 465 days.

(21) Appl. No.: 16/184,150

(22) Filed: Nov. 8, 2018

(65) Prior Publication Data
US 2019/0135267 A1    May 9, 2019

(30) Foreign Application Priority Data

Nov. 8, 2017   (JP) .............................. JP2017-215735

(51) Int. Cl.
*B60W 20/15*     (2016.01)
*B60W 10/08*     (2006.01)
*B60W 10/115*    (2012.01)
*B60W 30/19*     (2012.01)

(52) U.S. Cl.
CPC ............ *B60W 20/15* (2016.01); *B60W 10/08* (2013.01); *B60W 10/115* (2013.01); *B60W 30/19* (2013.01); *B60W 2510/0275* (2013.01); *B60W 2510/105* (2013.01); *B60W 2710/083* (2013.01); *B60W 2710/105* (2013.01)

(58) Field of Classification Search
CPC .... B60W 20/15; B60W 10/08; B60W 10/115; B60W 30/19; B60W 2510/0275; B60W 2510/105; B60W 2710/083; B60W 2710/105
See application file for complete search history.

(56) References Cited

U.S. PATENT DOCUMENTS

| 10,464,440 B2* | 11/2019 | Suzuki ..................... H02P 6/08 |
| 10,479,346 B2* | 11/2019 | Park ........................ B60W 20/15 |
| 10,696,176 B2* | 6/2020 | Ruiters ................... B60L 15/20 |
| 2008/0195286 A1* | 8/2008 | Tabata .................. B60W 10/08 701/51 |
| 2018/0237021 A1* | 8/2018 | Orita ..................... B60W 20/30 |
| 2019/0135267 A1* | 5/2019 | Kim ....................... B60W 10/08 |

FOREIGN PATENT DOCUMENTS

| JP | 2003-079005 A | 3/2003 |
| JP | 2004-080967 A | 3/2004 |
| JP | 2010-159036 A | 7/2010 |
| JP | 2011-011736 A | 1/2011 |
| JP | 2014-136491 A | 7/2014 |
| JP | 2017-155779 A | 9/2017 |

* cited by examiner

*Primary Examiner* — Redhwan K Mawari
(74) *Attorney, Agent, or Firm* — Oliff PLC

(57) ABSTRACT

A control system for hybrid vehicles for reducing a shock caused by a change in an output torque of a transmission during a shifting operation of a transmission. In the hybrid vehicle, an engine and a first motor are connected to an input side of an automatic transmission, and a second motor is connected to an output side of the automatic transmission. A controller calculates a change in an output torque of the transmission when establishing a predetermined gear stage, based on a torque capacity of an engagement device to be engaged and an input torque to the transmission, and select one of the first motor and the second motor that requires less power to reduce the change in the output torque of the automatic transmission.

6 Claims, 7 Drawing Sheets

| | K1 | K2 | K3 | K4 | B1 | B2 |
|---|---|---|---|---|---|---|
| 1st | ○ | ○ | | | | ○ |
| 2nd | ○ | | | | ○ | ○ |
| 3rd | | ○ | | | ○ | ○ |
| 4th | | | | ○ | ○ | ○ |
| 5th | | ○ | | | ○ | |
| 6th | ○ | | | | ○ | |
| 7th | ○ | | ○ | ○ | | |
| 8th | | | ○ | ○ | ○ | |
| 9th | ○ | | | ○ | ○ | |
| 10th | | ○ | ○ | | ○ | |
| Rev | | ○ | ○ | | | ○ |

CONTROL SYSTEM FOR HYBRID VEHICLE

CROSS REFERENCE TO RELATED APPLICATIONS

The present disclosure claims the benefit of Japanese Patent Application No. 2017-215735 filed on Nov. 8, 2017 with the Japanese Patent Office, the disclosure of which are incorporated herein by reference in its entirety.

BACKGROUND

Field of the Disclosure

Embodiments of the present disclosure relate to the art of a control system for a hybrid vehicle in which an engine and a motor are connected to an input side of an automatic transmission and another motor is connected to an output side of the transmission.

Discussion of the Related Art

JP-A-2014-136491 describes a hybrid vehicle in which an engine is connected to an input side of an automatic transmission and a motor is connected to an output side of the transmission. In the transmission of the hybrid vehicle taught by JP-A-2014-136491, a gear stage is established by engaging idling gears with shafts supporting the idling gears. For example, a speed of an input shaft of the transmission to which the engine is connected is lowered by an upshifting to reduce a speed ratio. In this case, a shift shock may be caused by inertial energies of the engine and the input shaft. In order to reduce such shift shock, according to the teachings of JP-A-2014-136491, an inertia torque applied to an output shaft of the transmission as a result of a change in the speed of the input shaft is cancelled by adjusting a torque of the motor connected to the output shaft.

When carrying out a shifting operation of the automatic transmission, first of all, a torque capacity of an engagement device engaged to establish a current gear stage is reduced while increasing a torque capacity of another engagement device to establish a target gear stage. Consequently, torques of rotary members such as gears in a torque transmitting path in the current gear stage are reduced gradually, and torques of rotary members such as gears in a torque transmitting path in the target gear stage are increased gradually. When the torque capacity of the engagement device to be engaged to establish the target stage is increased sufficiently, speeds of the input shaft, the engine connected to the input shaft, and the gears are changed toward a synchronous speed, and the shifting operation is completed when those speeds reach the synchronous speed. As described, according to the teachings of JP-A-2014-136491, a torque of the motor connected to the output shaft is controlled in such a manner as to reduce a shift shock caused by the inertia torque resulting from changes in speeds of the input shaft and the engine connected thereto. That is, according to the teachings of JP-A-2014-136491, the shift shock may be reduced by controlling the motor torque to reduce the change in the input speed of the transmission. However, such control of the motor torque may not be executed if the input speed to the transmission is not changed.

In addition, the teachings of JP-A-2014-136491 may not be applied to a hybrid vehicle in which a motor is connected an input side of a transmission to reduce a shift shock.

SUMMARY

Aspects of embodiments of the present disclosure have been conceived noting the foregoing technical problems, and it is therefore an object of the present disclosure to provide a control system for hybrid vehicles that can reduce a shift shock caused by a change in an output torque of a transmission during a shifting operation of the transmission.

The control system according to the embodiment of the present disclosure is applied to a hybrid vehicle in which an engine and a first motor are connected to an input side of an automatic transmission including a plurality of engagement devices, a second motor is connected to an output side of the automatic transmission, and a shifting operation of the automatic transmission is executed by engaging a predetermined engagement device. In order to achieve the above-explained objective, according to the embodiment of the present disclosure, a controller is configured to: calculate an amount of change in an output torque of the automatic transmission when establishing a predetermined gear stage, based on a relation between a torque capacity of the predetermined engagement device to be engaged to establish the gear stage of the automatic transmission and an input torque to the automatic transmission; select one of the first motor and the second motor that requires less power to reduce the amount of change in the output torque of the automatic transmission to a predetermined value; and use the selected motor to reduce the amount of change in the output torque of the automatic transmission to the predetermined value.

In a non-limiting embodiment, the predetermined gear stage may be established by engaging a plurality of the engagement devices in a predetermined order. The controller may be further configured to calculate the amount of change in the output torque of the automatic transmission based on a torque capacity of the disengaged engagement device of the plurality of the engagement devices to be engaged, in a case of engaging the plurality of the engagement devices in the predetermined order.

In a non-limiting embodiment, the controller may be further configured to calculate the amount of change in the output torque of the automatic transmission using an equation of motion of the automatic transmission. The predetermined value may be set to zero.

In a non-limiting embodiment, the controller may be further configured to: determine whether both of the first motor and the second motor are available to generate a torque to reduce the amount of change in the output torque of the automatic transmission; and select one of the first motor and the second motor that requires less power to reduce the amount of change in the output torque of the automatic transmission to the predetermined value, in a case that both of the first motor and the second motor are available to generate a torque to reduce the amount of change in the output torque of the automatic transmission.

Thus, according to the embodiment of the present disclosure, the amount of change in the output torque of the automatic transmission when establishing a gear stage is calculated based on the torque capacity of the engagement device to be engaged to establish the gear stage, and the output torque of the first motor or the second motor is controlled in such a manner as to reduce the amount of change in the output torque of the automatic transmission. According to the embodiment of the present disclosure, therefore, the amount of change in the output torque of the automatic transmission during execution of a shifting operation can be reduced by the first motor or the second motor irrespective of a change in an input speed to the automatic transmission. Further, the motor which requires less power is selected to reduce the amount of change in the output torque of the automatic transmission. Therefore, a shift shock caused by the change in the output torque of the automatic transmission can be reduced while maintaining a power balance between a discharging amount of electricity and a charging amount of electricity. Furthermore, since the motor which requires less power is selected to reduce the change in the output torque of the transmission, damages on the motor itself and the rotary members rotated by the torque of the motor can be limited.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
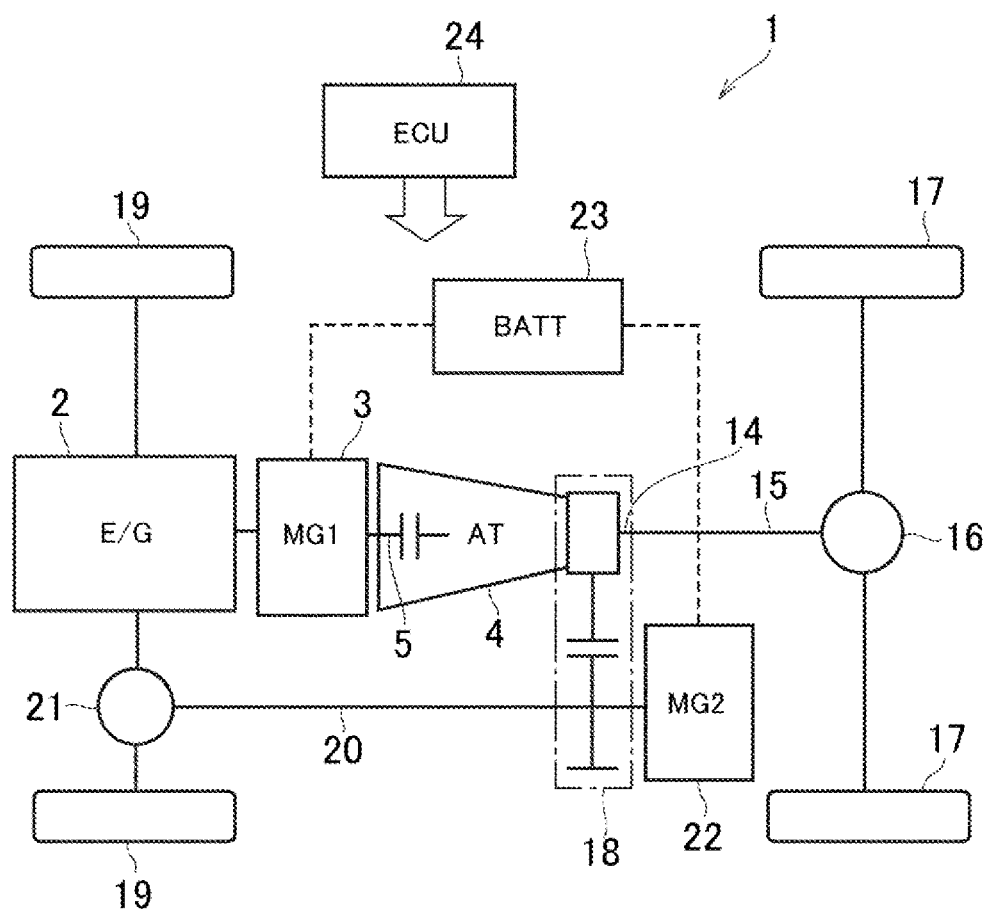
FIG. 1 is a schematic illustration showing a fundamental structure of the hybrid vehicle to which the control system according to the embodiment of the present disclosure is applied.

Embodiments of the present disclosure will now be explained with reference to the accompanying drawings. Turning now to FIG. 1, there is shown a structure of a hybrid vehicle (as will be simply called the "vehicle" hereinafter) 1 to which the control system according to the embodiment is applied. The vehicle 1 is a front-engine/rear-drive layout four-wheel drive vehicle in which an engine (referred to as "ENG" in FIG. 1) 2 is arranged in a front section of the vehicle 1. In the vehicle 1, a first motor (referred to as "MG1" in FIG. 1) 3 and an automatic transmission (referred to as "A/T" in FIG. 1) are arranged downstream of the engine 2. Specifically, an output shaft of the engine 2 and a rotor shaft of the first motor 3 are connected to an input shaft 5 of the automatic transmission (as will be simply called the "transmission" hereinafter) 4.

For example, an internal combustion engine such as a gasoline engine and a diesel engine may be used as the engine 2. An opening degree of an accelerator and a fuel injection in the engine 2 are controlled in accordance with a depression of an accelerator pedal to generates a required torque. The engine 2 may be idled while stopping a fuel supply to the engine 2 by a fuel-cutoff control. In this case, an engine braking force may be generated by a power loss such as a pumping loss. For example, a permanent magnet synchronous motor, that is, a motor-generator may be used as the first motor 3, and the first motor 3 is operated mainly as a generator.

Figures 2, 3:
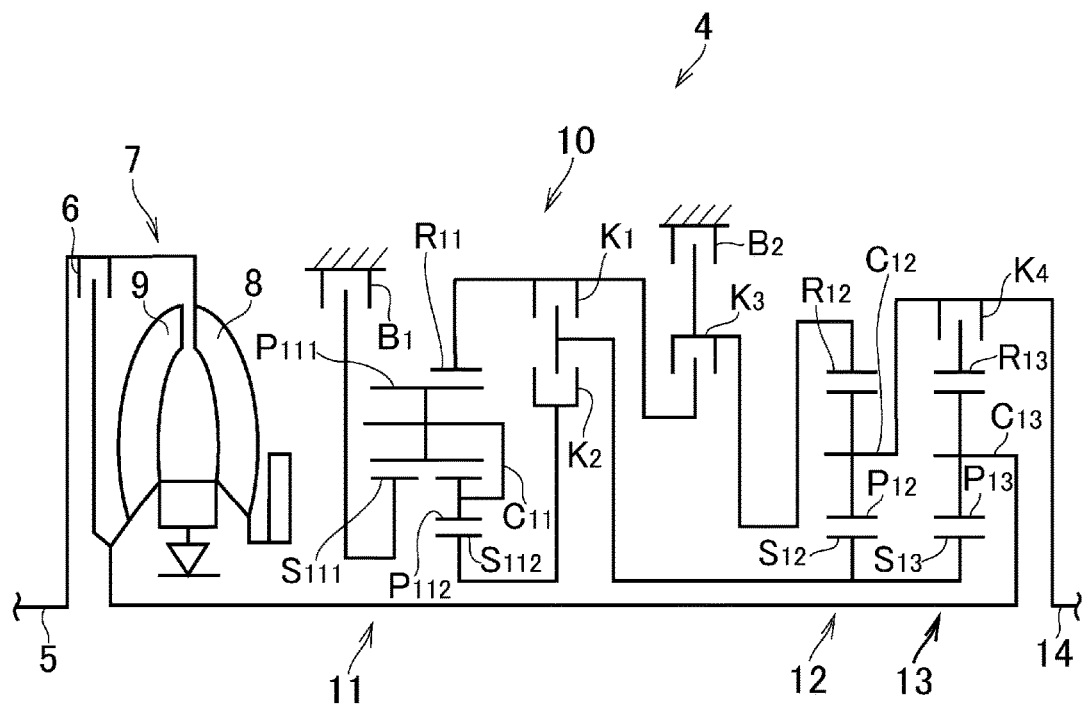
FIG. 2 is a skeleton diagram showing one example of a gear train of an automatic transmission arranged in the hybrid vehicle shown in FIG. 1.
FIG. 3 is a table showing engagement states of clutches and brakes in each gear stage of the transmission.

The transmission 4 comprises a plurality of engagement devices such as clutches and brakes, and a gear stage of the transmission 4 is shifted among a plurality of stages including a reverse stage by manipulating the engagement devices. For example, an automatic transmission described in JP-A-2017-155779 may be adopted as the transmission 4. A structure of the transmission 4 is shown in FIG. 2 in more detail.

In the transmission 4, a torque converter 7 having a lockup clutch 6 is arranged in an input side of the transmission 4. The torque converter 7 includes a pump impeller 8 as an input element and a turbine runner 9 as an output element. The input shaft 5 is connected to the pump impeller 8, and the turbine runner 9 is connected to a geared transmission section 10. The torque converter 7 may be omitted as necessary, and the input shaft 5 may be connected directly to the geared transmission section 10.

The geared transmission section 10 comprises a Ravigneaux first planetary gear set 11, a single-pinion second planetary gear set 12, and a single-pinion third planetary gear set 13. The first planetary gear set 11 comprises a first sun gear S111, a second sun gear S112, a ring gear R11, a plurality of first pinion gears P111 interposed between the first sun gear S111 and the ring gear R11, a plurality of second pinion gears P112 interposed between the second sun gear S112 and the first pinion gears P111, and a carrier C11 supporting the first pinion gears P111 and the second pinion gears P112 in a rotatable manner. That is, the first planetary gear set 11 performs a differential action among the first sun gear S111, the second sun gear S112, the ring gear R11, and the carrier C11. The first planetary gear set 11 further comprises a first brake B1 that selectively stops a rotation of the first sun gear S111.

The second planetary gear set 12 and the third planetary gear set 13 are arranged coaxially with the first planetary gear set 11. The second planetary gear set 12 comprises a sun gear S12, a ring gear R12, a plurality of pinion gears P12 interposed between the sun gear S12 and the ring gear R12, and a carrier C12 supporting the pinion gears P12 in a rotatable manner. That is, the second planetary gear set 12 performs a differential action among the sun gear S12, the ring gear R12, and the carrier C12. Similarly, the third planetary gear set 13 comprises a sun gear S13, a ring gear R13, a plurality of pinion gears P13 interposed between the sun gear S13 and the ring gear R13, and a carrier C13 supporting the pinion gears P13 in a rotatable manner. That is, the third planetary gear set 13 performs a differential action among the sun gear S13, the ring gear R13, and the carrier C13.

The sun gear S12 of the second planetary gear set 12 is formed integrally with the sun gear S13 of the third planetary gear set 13, and a unit of the sun gear S12 and the sun gear S13 is connected selectively to the ring gear R11 by engaging a first clutch K1. The unit of the sun gear S12 and the sun gear S13 is also connected selectively to the second sun gear S112 of the first planetary gear set 11 by engaging a second clutch K2. The ring gear R12 of the second planetary gear set 12 is connected selectively to the ring gear R11 of the first planetary gear set 11 by engaging a third clutch K3. A rotation of the ring gear R12 of the second planetary gear set 12 is selectively stopped by engaging a second brake B2.

The carrier C13 of the third planetary gear set 13 is connected to the turbine runner 9 of the torque converter 7 to serve as an input element of the geared transmission section 10. The carrier C12 of the second planetary gear set 12 is connected to an output shaft 14 of the geared transmission section 10 (or the transmission 4) to serve as an output element, and the carrier C12 is connected selectively to the ring gear R13 of the third planetary gear set 13 by engaging a fourth clutch K4. When the fourth clutch K4 is in engagement, specifically, two of the rotary elements of the second planetary gear set 12 are connected to two of the rotary elements of the third planetary gear set 13 so that the second planetary gear set 12 and the third planetary gear set 13 are rotated integrally without performing a differential action.

A frictional engagement device that is actuated hydraulically and whose torque capacity can be changed continuously may be used respectively as the first clutch K1 to the fourth clutch K4, and the first brake B1 and the second brake B2.

Engagement states of the clutches K1 to K4, and the brakes B1 and the brake B2 in each gear stage are shown in FIG. 3. As shown in FIG. 3, a forward stage of the transmission 4 may be selected from the 1st stage to the 10th stage, and a reverse stage (referred to as "Rev" in FIG. 3) is also available. In the table shown in FIG. 3, "0" represents engagement of the engagement device. Those engagement devices are actuated hydraulically, and a hydraulic control unit for manipulating the engagement devices is operated electrically. A shifting operation of the transmission 4 is executed when an operating point of the vehicle 1 governed by a position of the accelerator pedal and a vehicle speed shifts across a shifting boundary defining regions of the gear stages in a shifting map. Specifically, a target stage is determined based on a position of the accelerator pedal and a vehicle speed or a rotational speed of a predetermined rotary member corresponding to the vehicle speed, and the engagement devices are engaged and disengaged to establish the target stage. The gear stage may be shifted not only stage by stage, but also to the stage two or more stages higher or lower than the current stage. In a case of shifting the gear stage two or more stages higher or lower than the current stage, the gear stage may be shifted to the target stage via an interim stage.

Turning back to FIG. 1, the transmission 4 is connected to a rear differential gear unit 16 through a rear propeller shaft 15 so that the drive torque is distributed from the rear differential gear unit 16 to rear wheels 17. A transfer 18 is also disposed downstream of the transmission 4 so as to deliver output torque of the transmission 4 partially to front wheels 19 in a four-wheel drive mode. To this end, the transfer 18 is connected to a front differential gear unit 21 through a front propeller shaft 20 so that the torque is distributed from the front differential gear unit 21 to the front wheels 19.

For example, the transfer 18 may be a part-time transfer including a clutch (not shown) that selectively interrupt torque transmission to a gear train (not shown) for delivering torque to the front propeller shaft 20, a full-time transfer that always distributes torque to the front wheels 19 and the rear wheels 17 while allowing a differential rotation between the front wheels 19 and the rear wheels 17, and a full-time transfer that can selectively restrict a differential rotation between the front wheels 19 and the rear wheels 17.

A second motor (referred to as "MG2" in FIG. 1) is connected to the transfer 18 to drive the front propeller shaft 20 (i.e., the front wheels 19). The second motor is operated mainly as a motor to generate a drive torque to propel the vehicle 1, and hence a motor having a greater capacity than the first motor 3 is adopted as the second motor 22. In order to regenerate energy during deceleration, it is preferable to use a motor-generator such as a permanent magnet synchronous motor as the second motor 22. Specifically, the second motor 22 is connected to an output side of the transmission 4 through the transfer 18.

The first motor 3 and the second motor 22 are electrically connected with an electric storage device (referred to as "BATT" in FIG. 1) 23 such as a battery and a capacitor. In the vehicle 1, therefore, the first motor 3 and the second motor 22 may be operated individually as a motor by supplying electricity to those motors from the electric storage device 23, and electricity generated by the first motor 3 and the second motor 22 may be accumulated in the electric storage device 23. It is also possible to operate the second motor 22 as a motor by supplying electricity generated by the first motor 3 to the second motor 22 to propel the vehicle 1 by an output torque of the second motor 22.

The engine 2, the first motor 3, the second motor 22, the transfer 18 etc. are controlled by an electronic control unit (to be abbreviated as the "ECU" hereinafter) 24 as a controller. The ECU 24 is composed mainly of a microcomputer, and is configured to execute a calculation based on input data as well as data installed in advance, and transmits a calculation result in the form of command signal. The ECU 24 may also be formed by integrating an engine control unit, a motor control unit, a transmission control unit and so on.

Figure 4:
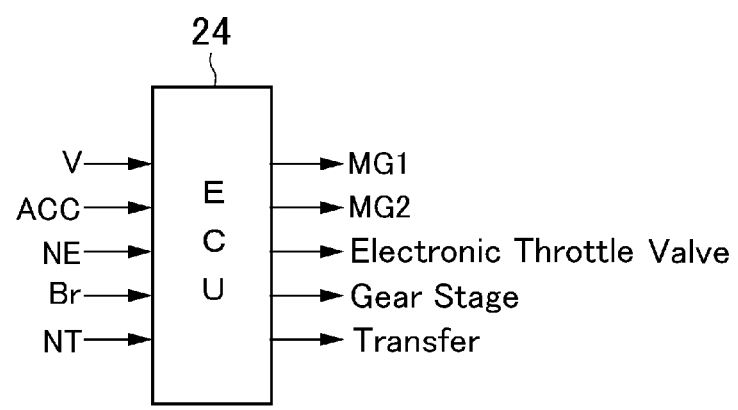
FIG. 4 is a block diagram showing input data and output commands to/from an electronic control unit.

As shown in FIG. 4, the ECU 24 receives data about; a vehicle speed V; an accelerator position ACC; a state of charge (to be abbreviated as the "SOC" hereinafter) level of the electric storage device 23; an engine speed Ne; an activation signal Br of the brake; a rotational speed of the input shaft 5 and so on. The ECU 24 transmits command signals for controlling the first motor 3, the second motor 22, an electronic throttle valve of the engine 2, the gear stage of the transmission 4, the transfer 18 and so on.

Figure 5:
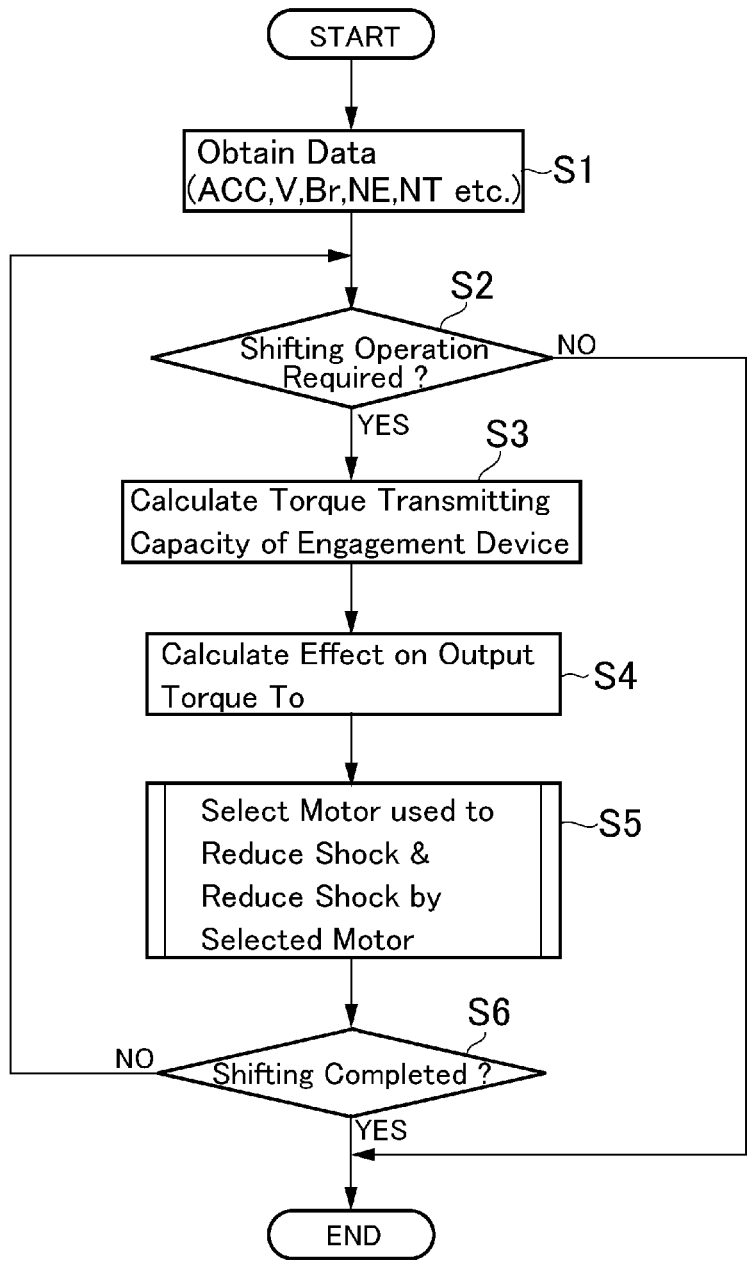
FIG. 5 is a flowchart showing one example of a routine to be executed by the control system according to the embodiment of the present disclosure.
Figure 6:
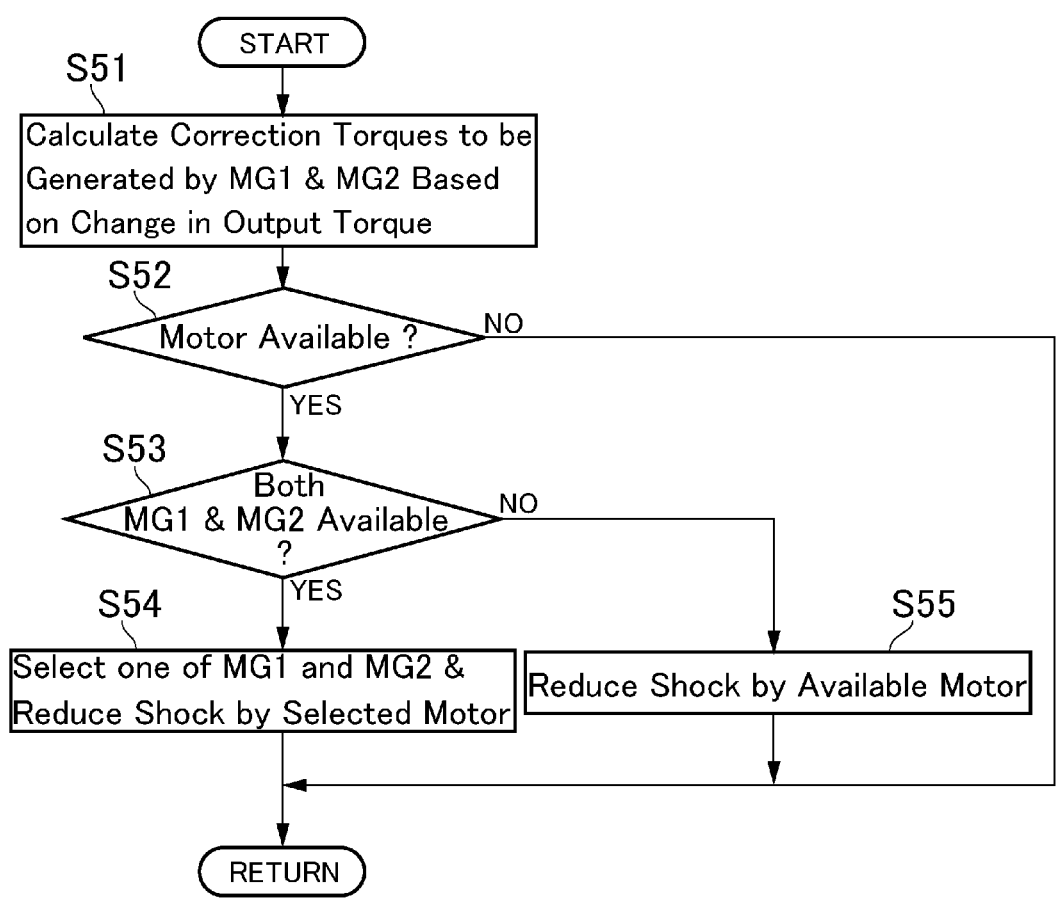
FIG. 6 is a flowchart showing one example of a subroutine executed at step S5 in the routine shown in FIG. 6.

When establishing a predetermined gear stage in the transmission 4 by engaging predetermined engagement devices, a shift shock may be caused by a change in a torque of the output shaft 14 (i.e., an output torque) resulting from a change in an operating condition of the geared transmission section 10. In order to reduce such shift shock, the ECU 24 executes routines shown in FIGS. 5 and 6 to correct a torque of any one of the first motor 3 and the second motor 22. The routines shown in FIGS. 5 and 6 are executed repeatedly at predetermined short interval.

At step S1, data about an accelerator position ACC, a vehicle speed V, an activation signal Br of the brake, an engine speed Ne etc. are obtained. Then, it is determined at step S2 whether a shifting operation of the transmission 4 is required to shift the gear stage to another gear stage by manipulating any of the engagement devices. For example, a condition to execute the shifting operation of the transmission 4 is satisfied when the operating point governed by the accelerator position ACC and the vehicle speed V shifts across the shifting boundary drawn in the shifting map. The condition to execute the shifting operation of the transmission 4 is also satisfied when a shift lever is shifted from a neutral position to a drive position to launch the stopping vehicle 1, and when the accelerator pedal is depressed to accelerate the vehicle 1 during coasting and hence a predetermined gear stage is required to be established in the transmission 4 from the neutral stage. In addition, the vehicle 1 may be propelled in an electric vehicle mode, and in the electric vehicle mode, the transmission 4 is brought into the neutral stage to disconnect the engine 2 and the first motor 3 from the front wheels 19 and the rear wheels 17. During propulsion in the electric vehicle mode, therefore, the condition to execute the shifting operation of the transmission 4 is also satisfied when the accelerator pedal is depressed and hence a predetermined gear stage is required to be established in the transmission 4 from the neutral stage.

If the shifting operation of the transmission 4 is not required so that the answer of step S2 is NO, the routine returns without carrying out any specific control. By contrast, if the shifting operation of the transmission 4 is required so that the answer of step S2 is YES, the routine progresses to step S3 to calculate a torque capacity of the clutch or the brake (i.e., the engagement device) to be engaged to establish a target gear stage. In this situation, the target gear stage is determined based on the accelerator position ACC and the vehicle speed V with reference to the shifting map, and the engagement device(es) to be engaged is determined depending on the target gear stage. In the case of engaging a plurality of the engagement devices to establish the target gear stage, the engaging devices are engaged in the most efficient order determined in advance taking account of easiness of engagement control. Given that the above-mentioned frictional engagement device is used as the engagement device, a hydraulic commend is transmitted from the ECU 24 in such a manner that a torque capacity of the engagement device is increased gradually or at a predetermined rate. At step S3, therefore, torque capacity of the engagement device may be obtained base on a value of the hydraulic command transmitted from the ECU 24 or an actual hydraulic pressure applied to the engagement device.

Then, at step S4, an effect of the torque capacity of the engagement device on an output torque To is calculated. Such calculation at step S4 may be executed using an equation of motion of the gear train of the geared transmission section 10. For example, in a case of carrying out an upshifting from a predetermined gear stage by disengaging one of the engagement device while disengaging another one of engagement device, a motion of the geared transmission section 10 can be expressed as:

$$To = \alpha \cdot Te - \beta \cdot Tcb$$

$$d\omega e/dt = 0 \cdot Te + 0 \cdot Tcb \quad (1)$$

where To is an output torque of the transmission 4, α and β are constants governed by a structure of the gear train, Te is a torque of the engine 2 or an input torque to the transmission 4, Tcb is a torque capacity of the engagement device to be engaged, and we is a speed of the engine 2.

In a case of establishing the 1st stage from the neutral stage by engaging the second brake B2, the second clutch K2, and the first clutch K1 in order, the output torque To of the transmission 4 when engaging the second brake B2 can be expressed as:

$$To = \alpha 1 \cdot Te + \beta 1 \cdot Tk1 + \gamma 1 \cdot Tk2 - \delta \cdot Tb2 \quad (2).$$

The output torque To of the transmission 4 when engaging the second clutch K2 can be expressed as:

$$To = \alpha 2 \cdot Te + \beta 2 \cdot Tk1 + \gamma 2 \cdot Tk2 \quad (3).$$

The output torque To of the transmission 4 when engaging the first clutch K1 can be expressed as:

$$To = \alpha 3 \cdot Te + \beta 3 \cdot Tk1 \quad (4).$$

In the above equations (2) to (4), α1 to α3 are constants governed by the structure of the gear train, Tk1 is a torque capacity of the first clutch K1, Tk2 is a torque capacity of the second clutch K2, and Tb2 is a torque capacity of the second brake B2.

Thus, a relation between the torque capacity of the engagement device to be engaged to establish the target gear stage and the output torque To can be expressed by the equation of motion, and the torque of the engagement device represented by the most right side member in the equation changes the output torque To.

Then, at step S5, the effect of the torque capacity of the engagement device on the output torque To, that is, a change in the output torque To (i.e., a shock) is reduced by correcting torque using the first motor 3 or the second motor 22. At step S5, specifically, the motor to be used to correct the torque is selected, and the selected motor is controlled to generate a predetermined torque. To this end, the sub-routine shown in FIG. 6 is executed at step S5.

As described, the relation between the torque capacity of the engagement device to be engaged to establish the target gear stage and the output torque To can be expressed by the equation of motion, and an amount of change in the output torque To can be calculated using the equation of motion. Specifically, a correction torque THmg1 required to be generated by the first motor 3 to reduce the amount of change in the output torque To to a predetermined value, and a correction torque THmg2 required to be generated by the second motor 22 to reduce the amount of change in the output torque To to the predetermined value, are calculated respectively at step S51.

As illustrated in FIG. 1, the first motor 3 is arranged coaxially with the engine 2 while being connected to the input shaft 5 of the transmission 4. Therefore, the amount of change in the output torque To can be reduced to the predetermined value (e.g., to zero) by adjusting the correction torque THmg1 generated by the first motor 3 in such a manner that a value of the engine torque Te is adjusted to be equal to a value of the member representing the torque transmitting capacity of the engagement device in the above-listed equations. On the other hand, torque of the second motor 22 is distributed to the front wheels 19 and the rear wheels 17 without passing through the transmission 4. Therefore, the amount of change in the output torque To can be reduced to the predetermined value (e.g., to zero) by adjusting the correction torque THmg2 generated by the second motor 22 to a value equal to the member representing the torque transmitting capacity of the engagement device in the above-listed equations.

Here will be explained an example of calculating the correction torque THmg1 to be generated by the first motor 3 and the correction torque THmg2 to be generated by the second motor 22 in a case of upshifting from the 2nd stage to the 3rd stage by engaging the second clutch K2, using the above-mentioned equations (1) to (3). In this case, the output torque To can be expressed by the equation (1) as follows:

$$To = \alpha \cdot Te - \beta \cdot Tk2.$$

In this case, if the first motor 3 is selected to reduce the amount of change in the output torque To, the correction torque THmg1 generated by the first motor 3 can be expressed as:

$$THmg1 = \beta \cdot Tk2/\alpha.$$

By contrast, if the second motor 22 is selected to reduce the amount of change in the output torque To, the correction torque THmg2 generated by the second motor 22 can be expressed as $$THmg2 = \beta \cdot Tk2.$$

Here, the constant "α" multiplying the engine torque Te is greater than "1" in an underdrive stage. Therefore, the correction torque THmg1 generated by the first motor 3 is smaller than the correction torque THmg2 generated by the second motor 22.

In the case of establishing the 1st stage from the neutral stage, the output torque To when engaging the second brake B2 can be expressed by the equation (2). In this situation, the amount of change in the output torque To can be reduced by controlling the input torque to the transmission 4 in such a manner as to approximate or equalize values of the first right member and the fourth right member in the equation (2). Such control may be executed by generating the connection torque THmg1 by the first motor 3, which can be expressed as:

$$THmg1=\delta \cdot Tb2/\alpha 1.$$

Otherwise, if the second motor 22 is used to reduce the amount of change in the output torque To, the second motor 22 is required to generate the correction torque THmg2 corresponding to the torque changed as a result of engaging the second brake B2, which can be expressed as:

$$THmg2=\delta \cdot Tb2.$$

In this case the constant "$\alpha$" multiplying the engine torque Te is significantly smaller than "1". In this case, therefore, the correction torque THmg1 generated by the first motor 3 is significantly greater than the correction torque THmg2 generated by the second motor 22. Specifically, the correction torque THmg1 generated by the first motor 3 may be more than hundred times of a torque capacity of the second brake B2 depending on the structure of the geared transmission section 10. In this case, therefore, it is impossible to use the first motor 3 to reduce the amount of change in the output torque To. In addition, if the first motor 3 generates the correction torque, electricity would be consumed significantly and hence a discharging amount of the electricity and a charging amount of the electricity may not be balanced.

After engaging the second brake B2, the second clutch K2 is engaged, and the output torque To in this situation can be expressed by the equation (3). In this situation, the amount of change in the output torque To can be reduced by controlling the input torque to the transmission 4 in such a manner as to approximate or equalize values of the first right member and the third right member in the equation (3). Such control may be executed by generating the connection torque THmg1 by the first motor 3, which can be expressed as:

$$THmg1=-\gamma 2 \cdot Tk2/\alpha 2.$$

Otherwise, if the second motor 22 is used to reduce the amount of change in the output torque To, the second motor 22 is required to generate the correction torque THmg2 corresponding to the torque changed as a result of engaging the second clutch K2, which can be expressed as:

$$THmg2=-\gamma 2 \cdot Tk2.$$

In this case the constant "$\alpha 2$" multiplying the engine torque Te is significantly smaller than "1". In this case, therefore, the correction torque THmg1 generated by the first motor 3 is significantly greater than the correction torque THmg2 generated by the second motor 22. Specifically, the correction torque THmg1 generated by the first motor 3 may be more than several ten times of a torque capacity of the second clutch K2 depending on the structure of the geared transmission section 10. In this case, therefore, it is also impossible to use the first motor 3 to reduce the amount of change in the output torque To. In addition, if the first motor 3 generates the correction torque, electricity would be consumed significantly and hence a discharging amount of the electricity and a charging amount of the electricity may not be balanced.

In shifting patterns other than the upshifting from the 2nd stage to the 3rd stage, the relation between the output torque To and the torque capacity of the engagement device to be engaged may also be expressed respectively by the equation of motion, and the output torque To may also be calculated using the equation of motion. In those cases, the correction torques to be generated by the first motor 3 and the second motor 22 corresponding to the amount of change in the output torque To may also be calculated respectively by the foregoing procedures.

Thus, at step S51, the correction torque THmg1 to be generated by the first motor 3 and the correction torque THmg2 to be generated by the second motor 22 are calculated respectively. However, those correction torques THmg1 and THmg2, especially the correction torque THmg1 may be significantly large to be generated by the first motor 3. In addition, any of the first motor 3 and the second motor 22 may not be used to generate the correction torque depending on an operating condition of the vehicle 1. For example, the first motor 3 or the second motor 22 may not be used to generate the correction torque in the event of failure or reduction in the SOC level. Therefore, at step S52, it is determined whether the motor possible to generate the correction torque effective to reduce the amount of change in the output torque To is available. If the motor cannot generate the maximum torque but possible to generate a torque effective enough to reduce the amount of change in the output torque To, the answer of step S52 will be YES. If none of the motor is available to generate the effective correction torque so that the answer of step S22 is NO, the routine returns without carrying out any specific control.

By contrast, if the motor possible to generate the correction torque effective to reduce the amount of change in the output torque To is available so that the answer of step S52 is YES, the routine progresses to step S53 to determine whether both of the first motor 3 and the second motor 22 can be used to generate the correction torque. That is, a feasibility to execute a shifting operation of the transmission 4 is determined at step S53. Therefore, if it is expected that the shifting operation cannot be executed properly even if the motor can generate the correction torque, the answer of step S53 will be NO. For example, in the case of upshifting from the 2nd stage to the 3rd stage, the motor to be used to generate the correction torque generates a positive torque to prevent reduction in the output torque To. In this case, if the first motor 3 is used to generate the correction torque, a speed of the input shaft 5 of the transmission 4 will be increased. However, during execution of upshifting, it is necessary to reduce the speed of the input shaft 5. That is, if the first motor 3 is used to generate the correction torque, the upshifting will not be executed properly. In this case, therefore, the first motor 3 is not available to generate the correction torque.

If both of the first motor 3 and the second motor 22 can be used to generate the correction torque so that the answer of step S53 is YES, the routine progresses to step S54 to select the motor that consumes less power to generate the correction torque to reduce the amount of change in the output torque To (that is, to reduce the shock), and to generate the correction torque by the selected motor. As described, in the case of engaging a plurality of the engagement device in the predetermined order to establish e.g., the 1st stage from the neutral stage, the output torque To is calculated in each timing of engagement of the engagement device (represented by the right most member in the equations (2) and (3)) based on the torque capacity of the engagement device and the input torque such as the engine torque Te, and the power to be consumed by the motor to generate the correction torque may be calculated based on the output torque To. Specifically, the power to be consumed by the first motor 3 to generate the correction torque Hmg1 may be calculated based on the correction torque Hmg1 and the engine speed Ne. On the other hand, the power to be consumed by the second motor 22 to generate the correction torque Hmg2 may be calculated based on the correction torque Hmg2, a speed ratio of the transmission 4, and a speed of the output shaft 14.

For example, in the case of upshifting from the 2nd stage to the 3rd stage, the correction torque THmg1 to be generated by the first motor 3 is smaller than the correction torque THmg2 to be generated by the second motor 22. However, the first motor 3 will raise the input speed to the transmission 4 in spite of the upshifting. In this case, therefore, the first motor 3 may not be used to generate the correction torque, and the second motor 22 is selected to generate the correction torque Hmg2. In addition, power consumption may be reduced by thus using the second motor 22 so that the power balance is maintained. Thus, at step S54, the selected motor 3 or 22 generates the correction torque THmg1 or THmg2 to reduce the amount of change in the output torque To of the transmission 4.

Otherwise, if both of the first motor 3 and the second motor 22 cannot be used to generate the correction torque so that the answer of step S53 is NO, the routine progresses to step S55 to generate the correction torque by the available motor, and thereafter the routine returns.

After generating the correction torque to reduce the shift shock at step S54 or S55, the routine progresses to step S6 to determine whether all of the engagement devices involving the shifting operation have been engaged completely, in other words, to determine whether the shifting operation is completed. If all of the engagement devices involving the shifting operation have not yet been engaged completely so that the answer of step S6 is NO, the routine returns to step S2 to repeat the foregoing steps. By contrast, if all of the engagement devices involving the shifting operation have been engaged completely so that the answer of step S6 is YES, the routine terminates.

Figure 7A:
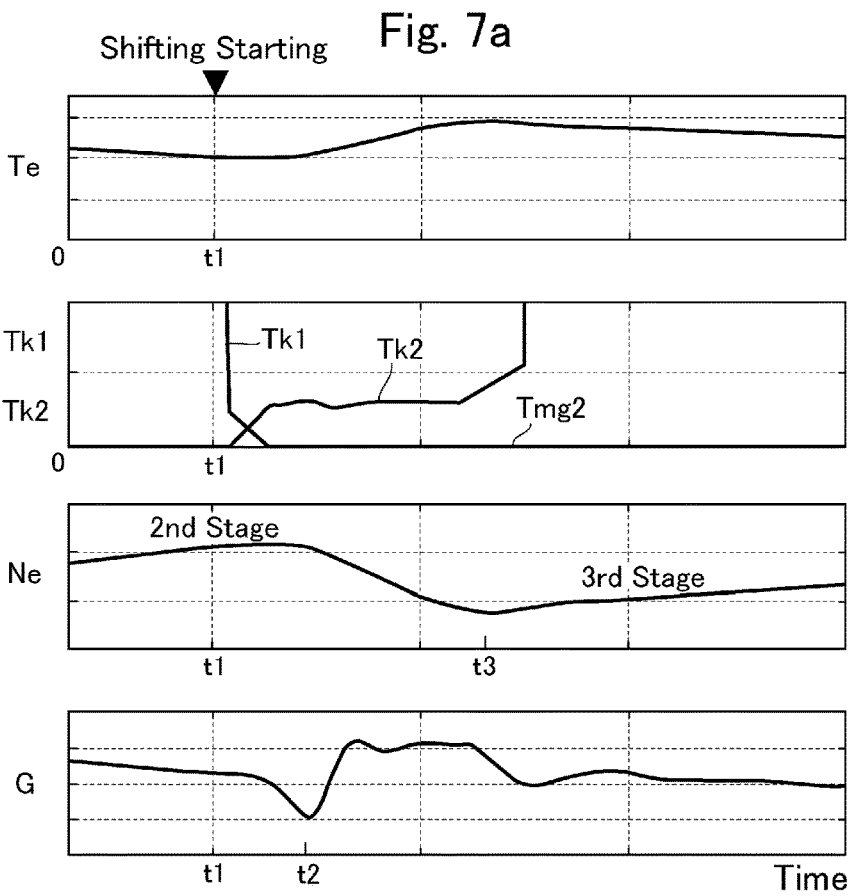
FIGS. 7(a) and 7(b) are time charts showing a situation during execution of upshifting from the 2nd stage to the 3rd stage.
Figure 7B:
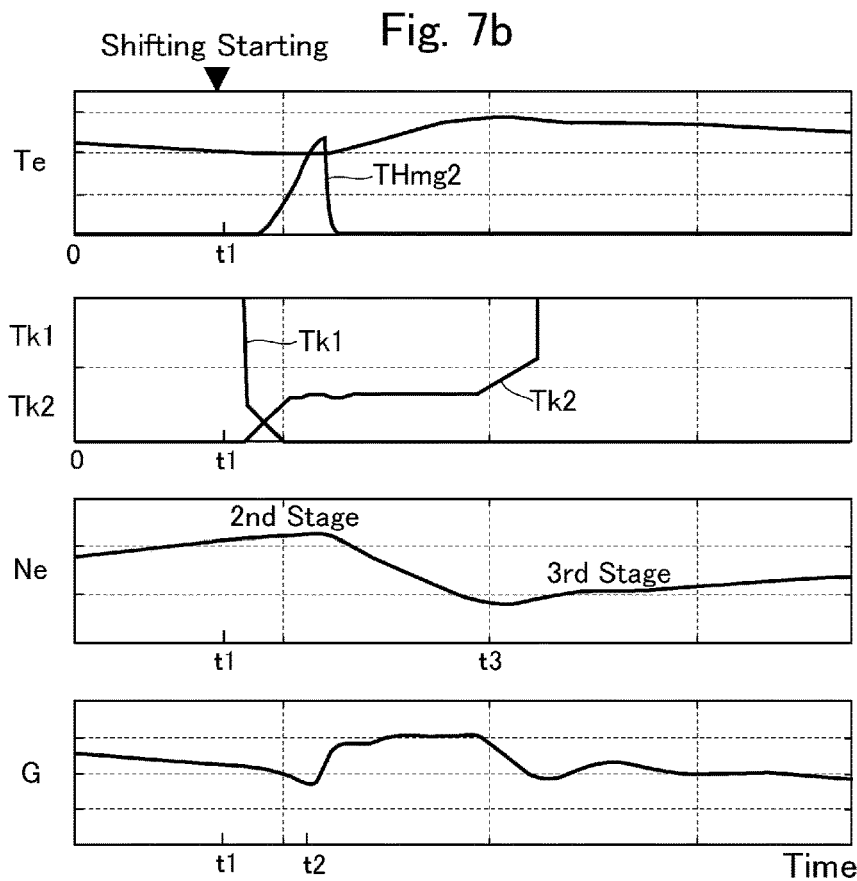

Here will be explained an advantage to be achieved by the embodiment of the present disclosure. FIG. 7(a) shows temporal changes in the engine torque Te, the torque capacity Tk1 of the first clutch K1, the torque capacity Tk2 of the second clutch K2, the engine speed Ne, and acceleration G, in the torque phase during execution of the upshifting from the 2nd stage to the 3rd stage without generating the correction torque THmg2 by the second motor 22. On the other hand, FIG. 7(b) shows temporal changes in the above-mentioned parameters in the torque phase during execution of the upshifting from the 2nd stage to the 3rd stage while generating the correction torque THmg2 by the second motor 22. Before point t1, the vehicle 1 is propelled in the 2nd stage while increasing the vehicle speed, and hence the engine speed Ne is increased gradually. The condition to shift the gear stage to the 3rd stage is satisfied at point t1 and the upshifting to the 3rd is commenced at point t1. Consequently, disengagement of the first clutch K1 and engagement of the second clutch K2 are started immediately after point t1. In this situation, the disengagement of the first clutch K1 and the engagement of the second clutch K2 are executed by a clutch-to-clutch method. Specifically, hydraulic pressure applied to the first clutch K1 is reduced to reduce a torque capacity to a predetermined value, and then the hydraulic pressure applied to the first clutch K1 is further reduced. At the same time, hydraulic pressure applied to the second clutch K2, in other words, a torque capacity of the second clutch K2 is increased at a predetermined rate to a level at which the engine speed Ne is not raised abruptly. Consequently, the clutch transmitting torque is switched gradually, and the torque applied to the rotary members in the transmission 4 is gradually with the progression of the upshifting from the 2nd stage to the 3rd stage, that is, with the progression of the torque phase.

In the torque phase, the acceleration G is reduced gradually by a reduction of the output torque To, and an inertia phase starts at point t2 when the speeds of the engine 2 and so on are changed immediately after the first clutch K1 is disengaged completely. In the inertia phase, the speeds of the engine 2 and so on are reduced toward the synchronous speed in the 3rd stage, and a resultant inertial torque is added to the output torque To thereby increasing the acceleration G. Then, at point t3, the speeds of the engine 2 and so on are reduced to the synchronous speed. In this situation, the hydraulic pressure applied to the second clutch K2 is raised at a predetermined rate, and then o the second clutch K2 is engaged completely by the pressure at a level of line pressure. As a result, the upshifting is completed.

If the second motor 22 does not generate the correction torque THmg2 during execution of the upshifting, the acceleration G corresponding to the output torque To drops significantly as indicated in FIG. 7(a), and thereafter the output torque To is increased significantly by a commencement of the inertia phase. In this case, therefore, the drive torque to propel the vehicle 1 is changed significantly by the change in the output torque To thereby causing a shift shock.

As indicated in FIG. 7(b), according to the embodiment of the present disclosure, the second motor 22 generates the correction torque THmg2 in accordance with an increase in the torque capacity of the second clutch K2 during the torque phase, that is, during a period from the commencement of the upshifting to point t2. Specifically, the second motor 22 generates the correction torque THmg2 until the torque capacity Tk2 of the second clutch K2 reaches a predetermined value. Here, since the second motor 22 generates the correction torque THmg2 in accordance with an increase in the torque capacity Tk2 of the second clutch K2, the correction torque THmg2 is increased slightly after the increase in the torque capacity Tk2 over the period from the torque phase to the inertia phase.

Thus, according to the embodiment of the present disclosure, the amount of change in the output torque To is reduced by the correction torque THmg2 generated by the second motor 22. According to the embodiment of the present disclosure, therefore, drop in the output torque To at the termination of the torque phase can be reduced so that a different of the output torque To from the output torque To in the oncoming inertia phase is reduced. For this reason, the amount of change in the output torque To and a change in the drive torque caused by such torque change can be reduced to prevent an occurrence of the shift shock. In addition, such torque control is carried out irrespective of a change in the rotational speed of the input shaft 5. Therefore, the change in the output torque To can be reduced in the torque phase thereby reducing the shift shock. Further, the motor which is advantageous to save the electricity is selected to generate the correction torque so that the power balance is maintained. Furthermore, since the motor which generates the smaller correction torque is selected, damages on the motor and the rotary members as well as bearings can be limited.

Figure 8:
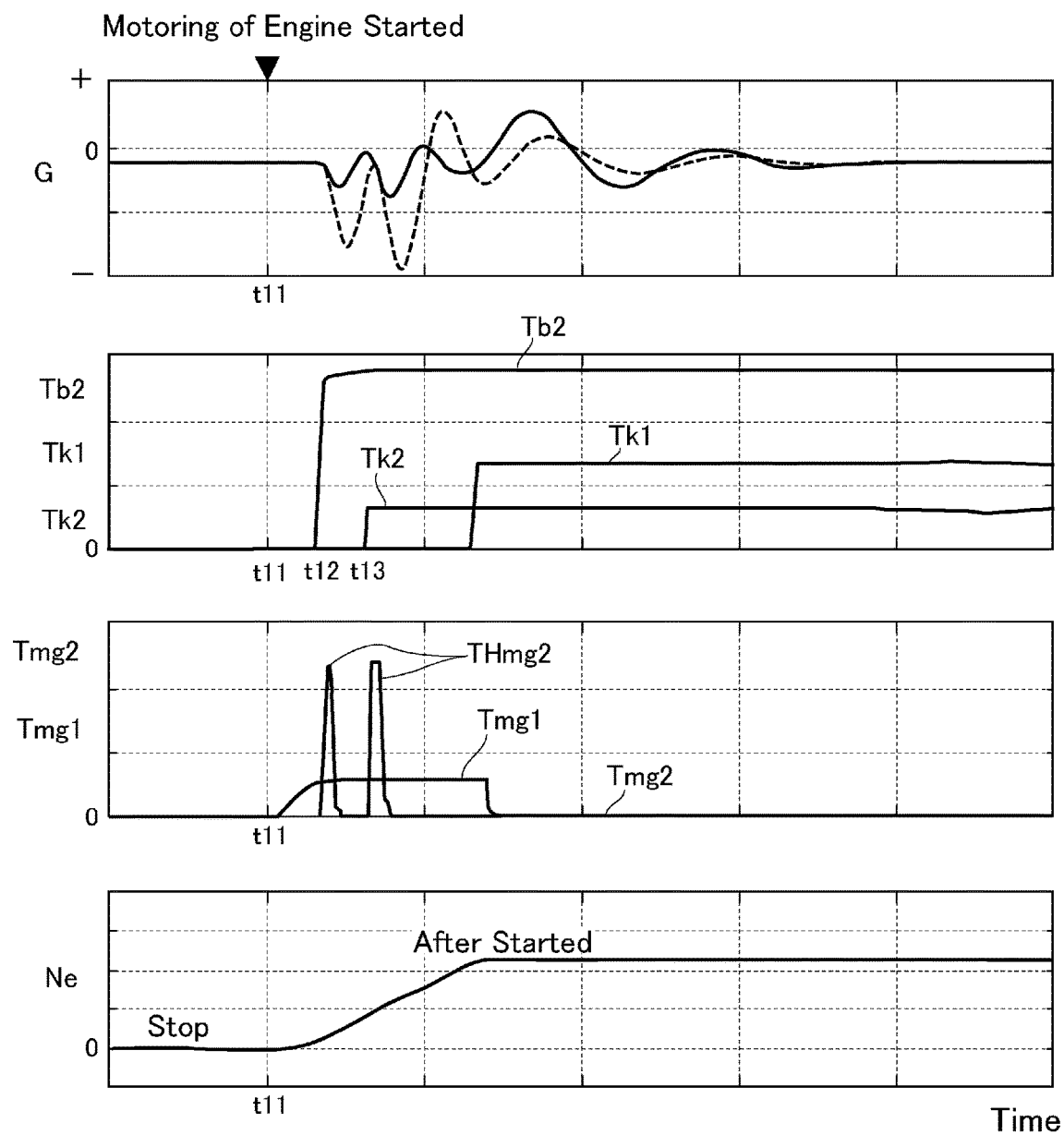
FIG. 8 is a time chart showing a situation when establishing the 1st stage from the neutral stage.

FIG. 8 shows temporal changes in the acceleration G, the torque capacity Tk1 of the first clutch K1, the torque capacity Tk2 of the second clutch K2, the torque capacity Tb2 of the second brake B2, the torque Tmg1 of the first motor 3, the torque Tmg2 of the second motor 22, and the engine speed Ne during establishing the 1st stage from the neutral stage, in both cases with or without generating the correction torque by the motor. Before point t11, the vehicle 1 is propelled while stopping the engine 2, and in this situation, the acceleration G is negative. When the accelerator pedal is depressed and hence the condition to start the engine 2 is satisfied at point t11, the first motor 3 is operated as a motor to crank the engine 2, in other words, a motoring of the engine 2 is carried out. In the case of establishing the 1st stage, the second brake B2, the second clutch K2, and the first clutch K1 are engaged in order.

Immediately after the commencement of the motoring of the engine 2, at point t12, the second brake B2 is engaged first of all. The output torque To in this situation is expressed by the equation (2). In this situation, if none of the motors generate the correction torque, the acceleration G decreases in accordance with the torque capacity Tb2 of the second brake B2 until the complete engagement of the second brake B2 (or until the termination of a change in the speed resulting from the engagement of the second brake B2) as indicated by the dashed line in FIG. 8. Then, the second clutch K2 is engaged at point t13, and the output torque To in this situation is expressed by the equation (3). In this situation, if none of the motors generate the correction torque, the acceleration G decreases in accordance with the torque capacity Tk2 of the second clutch k2 until the complete engagement of the second clutch k2 (or until the termination of a change in the speed resulting from the engagement of the second clutch k2 is terminated) as indicated by the dashed line in FIG. 8.

According to the embodiment of the present disclosure, the second motor 22 generates the correction torque THmg2 when engaging the second brake B2, and when engaging the second clutch K2. In this case, since the first motor 3 is used to start the engine 2, only the second motor 22 is available to generate the correction torque. As described, the correction torque THmg2 to be generated by the second motor 22 is calculated by multiplying the torque capacity Tb2 of the second brake B2 to be engaged or the torque capacity Tk2 of the second clutch K2 to be engaged by the predetermined constant.

Since the second motor 22 is connected to the output side of the transmission 4, the amount of change in the output torque To is reduced by generating the correction torque THmg2 by the second motor 22 as indicated by the solid line representing the acceleration G. By thus generating the correction torque THmg2 by the second motor 22, the change (or reduction) in the acceleration G, i.e., the output torque To is reduced in comparison with that of the case in which the correction torque is not generated by the motor. As a result, the shift shock is reduced. Then, in the example shown in FIG. 8, the first clutch K1 is engaged at point t14. Thus, the first clutch K1 is the last engagement device to be engaged to establish the 1st stage. When engaging the first clutch K1, a speed of the input side such as the engine speed Ne is synchronized with the synchronous speed in the 1st stage. Therefore, it is not necessary to generate the correction torque by the first motor 3 or the second motor 22.

Although the above exemplary embodiment of the present disclosure has been described, it will be understood by those skilled in the art that the present disclosure should not be limited to the described exemplary embodiment, and various changes and modifications can be made within the scope of the present disclosure. For example, the control system according to the embodiment may also be applied to a rear-drive or front-drive hybrid vehicle. In a case of applying the control system to those kinds of two-wheel-drive hybrid vehicles, the second motor 22 may be connected to drive wheels without interposing an automatic transmission therebetween. In the foregoing embodiment, the correction torque is calculated such that the change in the output torque To is reduced to zero, and a target value of the change in the output torque To is set to zero. However, the target value of the change in the output torque To may also be set to a value close to zero if it is possible to reduce the shift shock.

What is claimed is:

1. A control system for a hybrid vehicle in which an engine and a first motor are connected to an input side of an automatic transmission including a plurality of engagement devices, a second motor is connected to an output side of the automatic transmission, and a shifting operation of the automatic transmission is executed by engaging a predetermined engagement device of the plurality of engagement devices, the control system comprising:
   a controller that controls the first motor and the second motor;
   wherein the controller is configured to
   calculate an amount of change in an output torque of the automatic transmission during a period between a start and a completion of the shifting operation to establish a predetermined gear stage, based on a relation between a torque capacity of the predetermined engagement device to be engaged to establish the predetermined gear stage of the automatic transmission and an input torque to the automatic transmission,
   calculate, for each of the first motor and the second motor, power required to reduce the amount of change in the output torque of the automatic transmission that has been calculated to a predetermined value,
   select one of the first motor and the second motor that requires less power to reduce the amount of change in the output torque of the automatic transmission to the predetermined value,
   use the selected one of the first and second motors to reduce the amount of change in the output torque of the automatic transmission to the predetermined value,
   determine whether both of the first motor and the second motor are available to generate a torque to reduce the amount of change in the output torque of the automatic transmission,
   select one of the first motor and the second motor that requires less power to reduce the amount of change in the output torque of the automatic transmission to the predetermined value, in a case that both of the first motor and the second motor are available to generate the torque to reduce the amount of change in the output torque of the automatic transmission, and
   select one of the first motor and the second motor that is available to reduce the amount of change in the output torque of the automatic transmission to the predetermined value, in a case that the other one of the first motor and the second motor is not available to generate the torque to reduce the amount of change in the output torque of the automatic transmission.

2. The control system as claimed in claim 1,
   wherein the predetermined gear stage is established by engaging a plurality of the engagement devices in a predetermined order, and
   the controller is further configured to calculate the amount of change in the output torque of the automatic transmission based on a torque capacity of the disengaged engagement device of the plurality of the engagement devices to be engaged, in a case of engaging the plurality of the engagement devices in the predetermined order.

3. The control system as claimed in claim 1,
wherein the controller is further configured to calculate the amount of change in the output torque of the automatic transmission using an equation of motion of the automatic transmission, and
the predetermined value is set to zero.

4. The control system as claimed in claim 2,
wherein the controller is further configured to calculate the amount of change in the output torque of the automatic transmission using an equation of motion of the automatic transmission, and
the predetermined value is set to zero.

5. The control system as claimed in claim 1, wherein
a gear stage of the automatic transmission is shifted among a plurality of stages including at least:
   a neutral stage in which a torque transmission between an input shaft and an output shaft of the automatic transmission is interrupted,
   a first stage in which a gear ratio between the input shaft and the output shaft is a predetermined ratio,
   a second stage in which the gear ratio is smaller than the predetermined ratio, and
   a third stage in which the gear ratio is smaller than the gear ratio in the second stage, and
the controller is further configured to select the second motor to reduce the amount of change in the output torque of the automatic transmission to the predetermined value, when shifting the gear stage of the automatic transmission from the neutral stage to the first stage or when shifting the gear stage of the automatic transmission from the second stage to the third stage.

6. The control system as claimed in claim 1, wherein
the first motor is connected to the input side of the automatic transmission in a transmitting path of an output torque of the engine, and
the amount of change includes an amount of change in a torque of an output shaft of the automatic transmission.

* * * * *